United States Patent [19]
Kawada

[11] 3,936,378
[45] Feb. 3, 1976

[54] ROTARY STRAINER
[75] Inventor: Mitsuo Kawada, Toyota, Japan
[73] Assignee: Kito Machine Industries Co. Ltd., Toyota, Japan
[22] Filed: Jan. 22, 1974
[21] Appl. No.: 435,414

[30] Foreign Application Priority Data
Jan. 23, 1973 Japan............................. 48-010682

[52] U.S. Cl. ................ 210/107; 210/108; 210/394; 210/403; 210/404
[51] Int. Cl.² ........................................ B01D 33/06
[58] Field of Search ........... 210/391, 394, 402, 403, 210/404, 414, 415, 153, 159, 161, 83, 107, 108; 209/284, 288; 37/70, 43 D

[56] References Cited
UNITED STATES PATENTS

| | | | |
|---|---|---|---|
| 1,712,258 | 5/1929 | Compain............................. | 210/394 |
| 1,870,442 | 8/1932 | Coley................................. | 210/404 X |
| 2,734,355 | 2/1956 | Wenzelberger.................. | 210/415 X |
| 2,758,722 | 8/1956 | Murray.............................. | 210/403 X |
| 3,087,499 | 4/1963 | Carmichael, Jr................ | 209/288 X |
| 3,174,624 | 3/1965 | Putnam............................ | 209/288 X |
| 3,739,915 | 6/1973 | Kehoe et al...................... | 210/394 |

*Primary Examiner*—Theodore A. Granger
*Attorney, Agent, or Firm*—Edward J. Brenner

[57] ABSTRACT

A rotary strainer comprising a revolving box-like structure having a horizontal axis of revolution and a filtering net stretched around the external periphery of said box-like structure, wherein a mixture of liquid and solids is introduced into said box-like structure so as to primarily separate said solids and liquid by said filtering net, with the thus separated solids being dropped with rotation of said box-like structure onto a screw conveyor extending through the inside of said structure so as to discharge the separated solids out of the structure by said conveyor, and the bottom face of a screw conveyor chute provided below the screw is slanted downwardly toward the box-like structure so that the liquid adhering to the primarily separated solids will flow back toward said box-like structure by dint of said slant for further separation.

11 Claims, 2 Drawing Figures

ROTARY STRAINER

DETAILED DESCRIPTION OF THE INVENTION

This invention relates to a rotary strainer for separating sludge such as chips and a liquid such as washing or cleaning liquid or oil.

The devices using a filter or a magnet for separating a liquid-solid mixture such as above-mentioned are well known, but none of these known devices could produce a constant satisfactory separating effect either because the filter would become clogged in long time use, lowering the filtering performance or because certain types of sludge material would not be adsorbed or sucked up by the magnet.

It is therefore an object of the present invention to provide a strainer whereby an excellent separating effect can be constantly obtained.

Another object of the present invention is to obtain a strainer which has high throughput capacity and which is free of trouble such as clogging even if it is used for a long time.

The strainer according to the present invention features a primary separating action provided by a filter net stretched over the entire periphery of a revolving box-like structure and a secondary separating action produced by the liquid flow during carriage of the sludge dropped onto a screw conveyor chute having a slant bottom face, said both primary and secondary separating actions being combined to achieve effective and efficient separation of the sludge such as chips and liquid such as washing or cleaning liquid.

Figure 1:
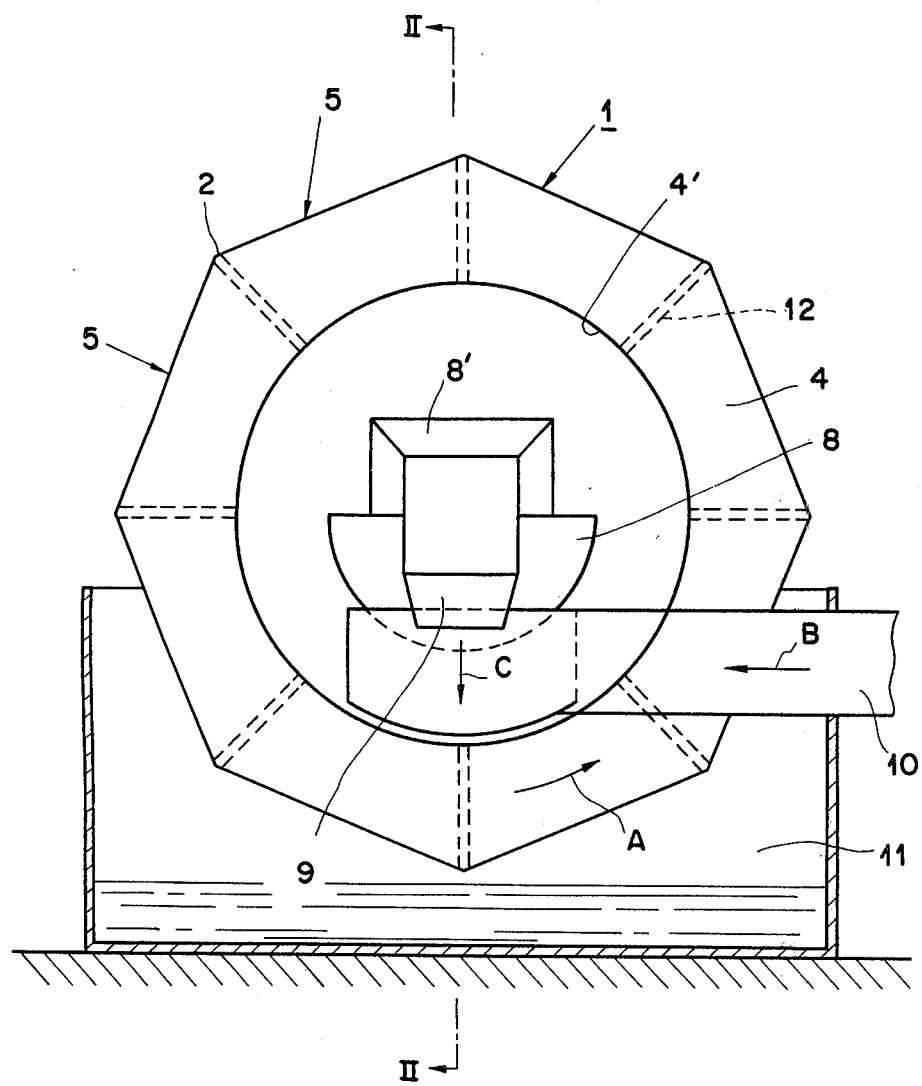
Figure 2:
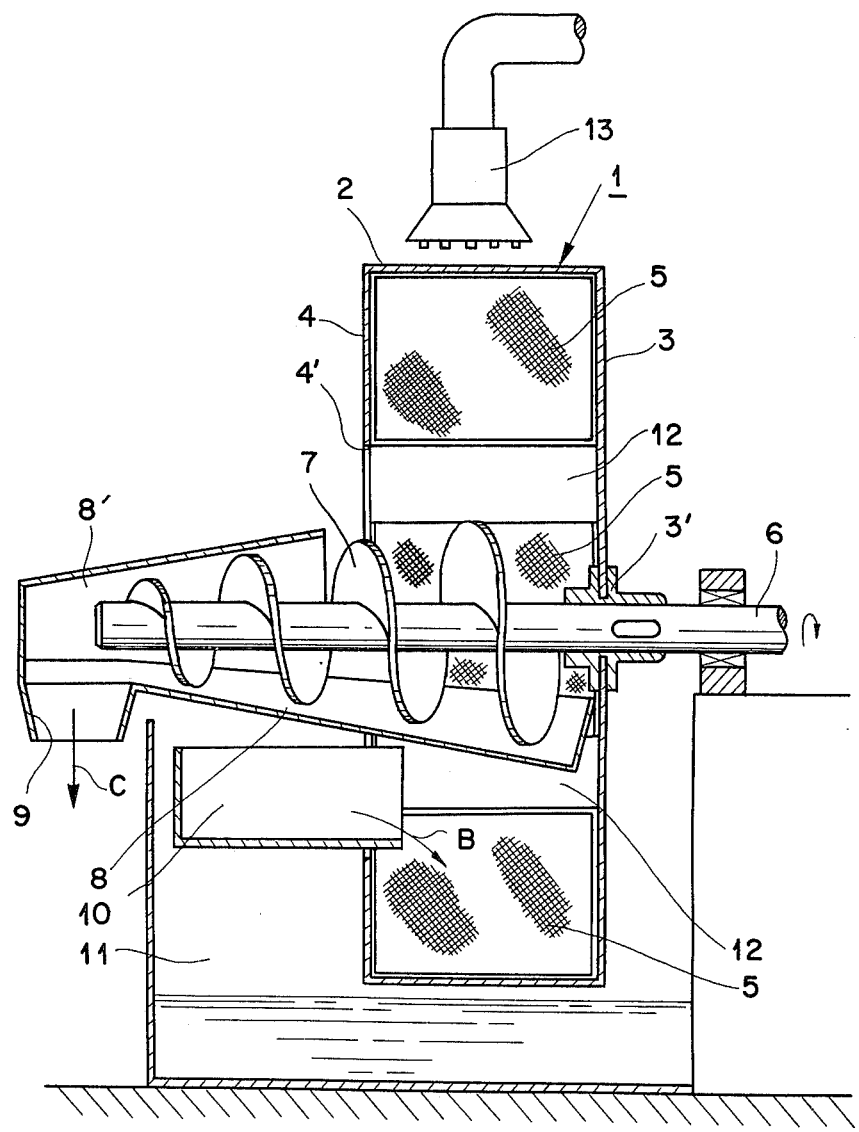

The other objects, features and advantages of the present invention will become apparent from the following detailed description of the invention as taken in conjunction with the accompanying drawings, in which:

FIG. 1 is a front elevation showing schematically an embodiment of the present invention; and FIG. 2 is a sectional view taken along the line II—II of FIG. 1.

Referring to the drawings, there is shown a strainer, generally designated 1, comprising a hexagonal box-like structure 2 of which the rear side is closed with a base plate 3 while the front side is opened through a circular opening 4' formed in a plate 4. A filter net 5 is spread over the periphery of the box-like structure. The base plate 3 of the strainer 1 is secured through a cylindrical retainer 3' to a horizontally disposed driving shaft 6 so that the strainer 1 will rotate integral with said driving shaft 6.

The fore end portion of said driving shaft 6 projects out from the opening 4' of the strainer 1 and is provided therearound with a screw 7 that continues from the portion inside the structure 2. Provided below said screw 7 is a screw conveyor chute 8 having a bottom face slanted toward the strainer 1. It is to be noted that the vane diameter of the screw 7 changes successively in its axial direction in accordance with the angle of slant of said conveyor chute 8. The conveyr chute 8 is provided with an upper cover 8'. This upper cover 8' and the fore end of the conveyor chute 8 define a downwardly bent discharge port 9. Provided beneath the conveyor chute 8 is a passage 10 which opens into the box-like structure 2 through the opening 4' and which is designed to introduce the mixture materials such as sludge and liquid therethrough into the inside of said structure 2.

There are also provided a tank 11 and a plurality of partition plates 12 arranged radially in the inside of the structure 2. These partition plates 12 function to positively guide the sludge such as chips in the strainer 1 upwardly with rotation of said strainer 1.

In operation of the present strainer, it is rotated by the driving shaft 6 at the rate of about one rotation per minute in the direction of arrow A and the mixture materials to be separated are introduced into the box-like structure 2 through the passage 10 as shown by arrow B, whereby the liquid such as cleaning liquid or oil is guided into the tank 11 through the filter net 5 spread around the periphery of said structure 2 while the sludge such as chips is reservoired within the structure 2, and thus the primary separation is accomplished by the filter net 5. The sludge reservoired within the structure 2 is guided upwardly by the partition plates 12 with rotation of the strainer 1 until finally it is dropped onto the screw conveyor chute 8. The sludge dropped onto said chute 8 has still attached thereto the liquid such as cleaning liquid or oil, but such liquid is separated from the sludge by the secondary separating action that is performed during carriage by the screw 7. That is, as the bottom face of the conveyor chute 8 is inclined downwardly toward the inside of the structure 2, the liquid such as cleaning oil is obliged to flow to the right in FIG. 2 on the inclined bottom face of the conveyor chute 8 when the sludge is carried toward the discharge port 9 by the screw 7 with rotation of the driving shaft 6, and thereby the liquid is substantially separated from the sludge. Arrangement may be made such that the liquid remaining on the conveyor chute 8 will be flown over the upper edge of the chute, or a suitable hole or holes may be formed in the chute 8 to let the liquid fall down through such hole or holes. The liquid dropped from the conveyor chute 8 is again guided into the tank 11 by passing through the filter net 5.

Needless to say, the sludge discharged out from the discharge port 9 as shown by arrow C is removed by a suitable means. Also, a suitable discharge means is provided in the tank 11 so that the surface of the liquid in the tank will not rise above a certain level.

Preferably, an air nozzle 13 for injecting air is provided immediately above the strainer 1 as shown in FIG. 2. By this means, the sludge particles such as chips adhering to the filter net 5 are forcibly excluded to keep the filter net 5 almost perfectly safe from clogging.

While the present invention has been described by way of a preferred embodiment as illustrated in the accompanying drawings, it should be understood that the present invention can be also embodied in various other forms within the scope of the appended claims.

I claim:

1. A rotary strainer comprising in combination:
   a box-like structure having a substantially horizontal axis of revolution and provided with an opening at one side thereof, with a filter net being spread over the entire periphery thereof;
   a screw extending through the inside of said box-like structure and protruding out of said structure from said opening thereof;
   a screw conveyor chute provided below said screw and having a slant bottom face inclined downwardly toward said box-like structure;
   a shaft axially connected to the screw and to the box-like structure, wherein the screw is tapered inward from a maximum dimension near connecting means mounted on the box-like structure opposite the opening, wherein the screw closely approaches the the inclined chute, and wherein the shaft is connected to the box-like structure and to the screw for simultaneously rotating the box-like structure and the screw, a passage for introducing a liquid-solid mixture to be separated into said box-like structure through said opening; and driving means connected to the shaft for rotating said box-like structure and said screw.

2. The rotary strainer as set forth in claim 1, including a plurality of partition plates provided in said box-like structure radially to extend from the periphery of said structure toward the axis of rotation thereof.

3. The rotary strainer as set forth in claim 1, wherein the vane diameter of the screw varies in accordance with the angle of slant of the screw conveyor chute.

4. The rotary strainer as set forth in claim 1, wherein an air nozzle for injecting compressed air is provided at a fixed position above the periphery of said box-like structure.

5. The rotary strainer as set forth in claim 1, wherein a liquid storage tank is provided below the box-like structure.

6. The rotary strainer as set forth in claim 1, wherein the box-like structure and the screw share a same shaft for rotation.

7. A rotary strainer comprising in combination a box-like structure having a substantially horizontal axis of rotation and provided with an opening at one side thereof, with a filter net being spread over an entire periphery of the structure, connecting means mounted on the box-like structure opposite the opening, for connecting a shaft to the structure;

a shaft connected to the connecting means and extending therefrom into an inside of the structure;

a screw mounted on the shaft extended through the inside of the box-like structure and protruded out of the structure through the opening;

a screw conveyor chute provided below said screw and having a slant bottom face inclined upwardly, extended through the inside of the structure and out of the box-like structure through the opening, wherein the screw is tapered inward from a maximum dimension near the connecting means, wherein the screw closely approaches the inclined chute, and wherein the shaft is connected to the box-like structure and to the screw for simultaneously rotating the box-like structure and the screw.

8. The rotary strainer apparatus as set forth in claim 7 wherein the shaft is substantially horizontal is tapered inward from a maximum dimension near the connecting means, and wherein the screw closely approaches the inclined chute.

9. The rotary strainer apparatus of claim 7, wherein the chute substantially surrounds the screw externally of the box-like structure and terminates in a downward opening remote from the box-like structure.

10. The rotary strainer apparatus of claim 7 wherein the chute has a curved bottom and an open top inside the box-like structure.

11. The rotary strainer as set forth in claim 7, wherein an air nozzle for injecting compressed air is provided at a fixed position above the periphery of said box-like structure.

* * * * *